May 27, 1958

F. A. DODGE 2,836,244

CODE TAPE PUNCH

Filed Nov. 15, 1954

INVENTOR.
FLAVIUS A. DODGE
BY C. C. Stratton
ATTORNEY

United States Patent Office 2,836,244

Patented May 27, 1958

2,836,244

CODE TAPE PUNCH

Flavius A. Dodge, Los Angeles, Calif.

Application November 15, 1954, Serial No. 468,712

5 Claims. (Cl. 164—111)

This invention relates to a punch to perforate information or record tapes and, while adapted for perforating tapes initially, is more particularly adapted as a correction punch for the correction, addition or deletion of information from record tapes.

In coded binary and decimal or similar tapes, error may occur in the initial punching operation. It is an object of the present invention to provide a hand-operated punch that, primarily, provides a device for correction and repair of tapes.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Figures 1, 2, 3, 4, 5:
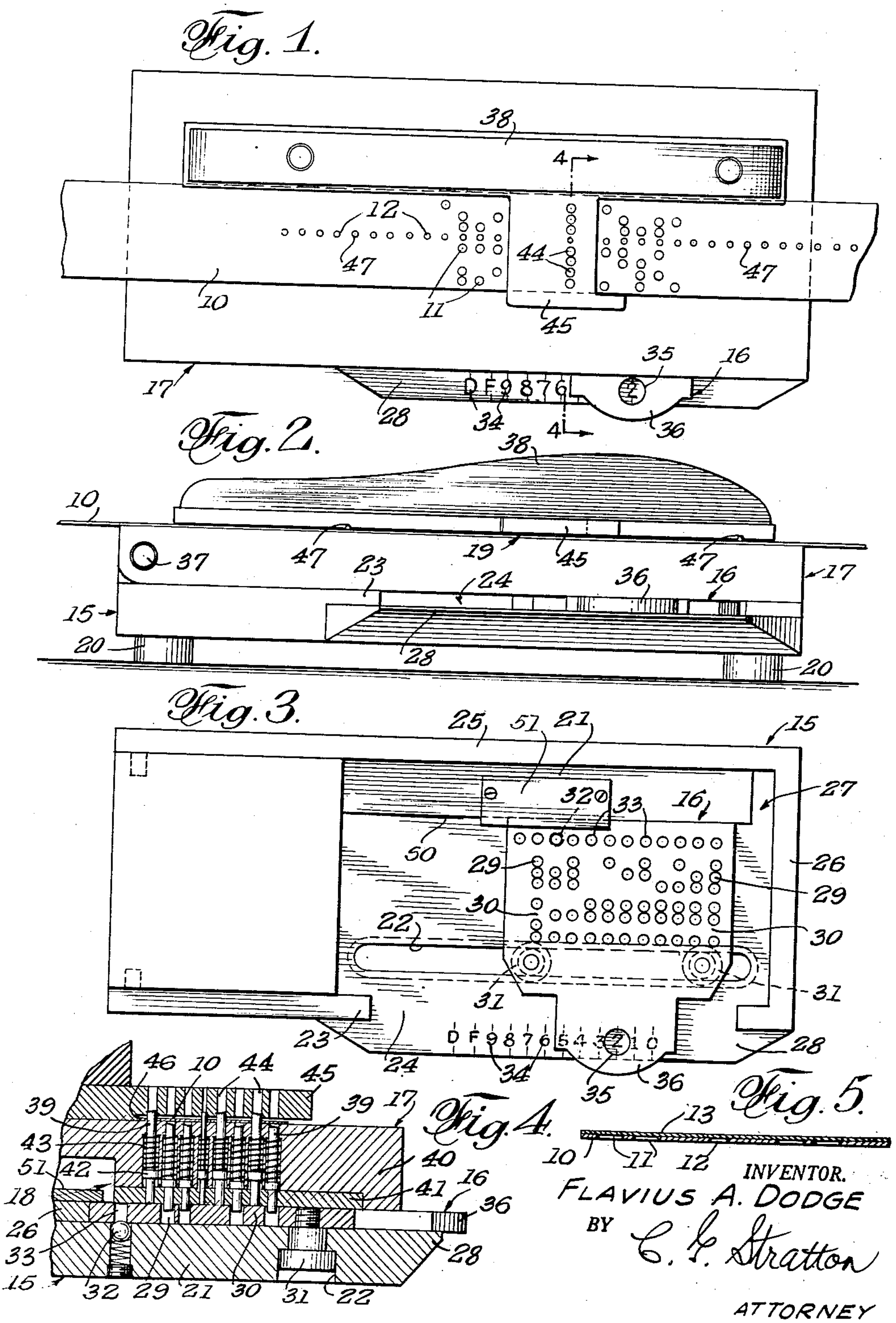
Fig. 1 is a top plan view of a code punch according to the present invention.
Fig. 2 is a side elevational view thereof.
Fig. 3 is a top plan view of the punch with the top portion thereof removed.
Fig. 4 is an enlarged fragmentary cross-sectional view as taken on line 4—4 of Fig. 1.
Fig. 5 is a further enlarged cross-sectional view of the tape as prepared for use in the present punch.

The device that is illustrated may be employed to punch information or record data on a tape 10, said data being provided in the form of perforations 11 which control code machines into which such tape is fed. Some or all of said tapes are also provided with feed sprocket holes or the like 12. The above use is supplemental to perforation punching in key-operated or similar machine. A more particular use is to punch corrected or added information or data on a tape already key punched, it being contemplated to mask or cover an incorrectly punched part of a tape with a mask 13 (Fig. 5) and then perforate said mask in a device as herein disclosed.

The present punch device comprises, generally, a base 15, a code plate 16 adjustably mounted on said base, a cover plate 17 for said base and overstanding the code plate. Punch means 18 is carried by the cover plate and operable by said code plate upon moving of the cover plate into juxta-position with base 15, and tape-locating means 19 disposed upon cover plate 17.

The base 15 is shown as a rectangular member mounted on feet 20 and preferably supported in a horizontal position, as shown, and provided with a bottom wall 21 in which is formed a longitudinal slot 22. Said base has a front wall 23 having an opening 24 substantially as long as the effective length of slot 22 (Fig. 3). The top edge of wall 23 and the back and end walls 25 and 26, respectively, define a recess 27 in the top of base 15 of which wall 21 comprises the bottom. Said wall 21 is provided with a forwardly extending lip 28 on the outer side of front wall 23, and located adjacent the opening 24.

The code plate 16 is disposed in recess 27 and is substantially as thick as the recess is deep. Said plate 16 is preferably made of a hard material, such as steel and is provided with different groups of perforations 29 that are differently spaced, as shown. Said perforations are receptive of the punch means 18 while the spaces 30 provided among the differently grouped perforations 29 constitute the punch means operating portions of the code plate 16. Actually, therefore, plate 16 is a negative with respect to the positive perforations to be made in tape 10, the perforations of one being aligned with the spaces between the perforations of the other.

In order that code plate 16 may be adjusted to bring one of its lines or rows of perforations 29 and spaces 30 into punch-operating position, said plate is provided with stud guides 31 that operate in slot 22, the two guides shown serving to retain plate 16 in desired alignment for longitudinal adjustment.

Location of the code plate 16 is effected through the medium of a detent 32 which is resilient and selectively engaged with a line of holes 33 in said plate. While a ball detent is shown, any suitable spring detent may be used, providing the code plate may readily be moved in either direction with equal facility.

So that a selected line of perforations 29 and spaces 30 may be located in punch-operating position, the lip 28 of base 15 is provided with suitable indicia 34 that may be read in connection with an index or, as shown, a sight hole 35 formed in a forward extension 36 of code plate 16. Since said extension covers adjacent indicia, the indicium revealed by sight hole 35 readily indicates that the desired position of the code plate has been achieved. In this case, the figure "2," seen through hole 35, indicates that the second row from the left of perforations 29 and spaces 30 has been aligned with the punch means 18. The detent 32 will retain the plate in this position until a change of position is desired and plate 16 moved accordingly.

The cover plate 17 is preferably attached to base 15. In this case, a hinge 37 is provided at the end remote from the recess 27 enabling plate 17 to be swung upward on said hinge to separate the code plate 16 and the punch means 18. Thus, the former is clear to be adjusted.

Plate 17 is preferably rectangular and of a size to conform to the size of base 15. Raising the same on its hinge 37 is facilitated by the provision of a handle 38.

The punch means 18 is best seen in Fig. 4 and preferably comprises a plurality of punch pins 39 that extend through a thickened portion 40 of cover plate 17 and are arranged in a single line in register with the rows of perforations 29. Said pins 39 are retained in position by a plate 41 fastened to the bottom of cover plate 17, the pins being provided with shoulder flanges 42 that are pressed by springs 43 to retract the pins below the upper surface of cover plate 17. Below said flanges, the pins extend beyond the bottom of plate 41 and, therefore are adapted to enter into the perforations 29 of the code plate 16.

It will be clear that when cover plate 17 is closed over the base 15 with the code plate in an adjusted position, any of the punch pins 39 that are aligned with perforations 29 will remain retracted since said lower ends of the pins will enter said perforations. Only those pins that are aligned with spaces 30 will be projected by the code plate against the biasing force of springs 43.

Said pins 39 are projected into aligned perforations 44 provided in a shear plate 45 mounted on cover plate 17 in spaced relation to the top face of said cover plate.

The tape-locating means 19 comprises a shoulder 46 provided in shear plate 45 and constituting a lateral abutment against which one edge of tape 10 is adapted to be placed. If the tape has sprocket holes 12, the locating means 19 also includes projections 47 on the upper face of the cover plate, the same being used to locate tape 10 end-wise with respect to the punch means.

The efficiency of operation of the present device may be improved by providing an edge guide 50 in recess 27 so that the same cooperates with slot 22 and stud guides 31 to hold the plate 16 aligned with the punch means 18 during movement thereof from one position to another. Also, a retainer plate 51 may be attached to edge guide 50 and have overstanding engagement with the adjacent portion of plate 16, thereby obviating tipping of the latter under the spring pressure of detent 32.

The force required to punch through the tape 10 may be minimized in two ways—the punching ends or faces of the punches may be disposed at the slight angle shown and said punches 39 may each be a different length. Thus, even if all of the punches are brought into operation, they will punch successively, rather than simultaneously, and the power to move each punch will, in addition, be low because of the slope of the punch end.

The operation is quite simple. The code plate 16 is located to bring the desired line of perforations 29 and spaces 30 in operative position with the punching means 18. A tape 10 with a mask 12 over an improperly perforated portion of the tape is positioned by means 19 so that said masked portion is in register with the punch pins 39. Now, the cover plate is depressed toward the base to cause the pins 39 to pierce the tape and enter the holes 44 in shear plate 45. Upon release of the cover plate, the springs 43 will act to retract pins 39 and thus raise the cover plate on its hinge. The newly punched tape may now be removed from the device.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A code tape punching device, comprising a base having a top recess therein and provided with a longitudinal slot and with a front opening, a code plate slidably disposed in said recess whereby the same can be moved to a code selected position, said plate being provided with studs engaged in said slot to guide adjustment of the plate in the recess, a front projection on said plate extending forwardly through said base opening and having an opening therein, plate-locating indicia provided on the base and viewable through said opening in the code plate extension, a cover plate hingedly connected to the base and adapted to be moved into juxtaposition with said base, means to locate a perforated tape on the outer face of the cover plate, and a set of in-line normally-retracted punch elements carried by said cover plate said elements being movable by the selected position of the code plate to projected tape-piercing position when said cover plate is moved on its hinge toward juxtaposed position with the base.

2. A code tape punching device, comprising a base having a recess therein, said base being provided with a longitudinal slot in the bottom thereof providing an opening into said recess, a code plate slidably disposed in said recess, said code plate having studs engaged in said slot to facilitate the sliding thereof, an extension on said code plate projecting through an opening in the side of said base, said extension serving as a means for moving said code plate within said recess, whereby said code plate can be moved to a code selected position, a cover plate hingedly connected to said base at one end thereof, a plurality of punch elements carried by said cover plate, each of said elements having one end projecting outwardly from said cover plate toward said code plate, said elements thereby being adapted to be actuated by said code plate when said cover plate is moved into juxtaposition with said base, a shear plate carried by said cover plate and disposed adjacent to said punch elements, the elements actuated by said code plate being projected into openings in said shear plate, and guide means provided on one of the two latter plates to engage and locate a code tape on the cover plate for punching.

3. A code tape punching device according to claim 2 in which said code plate has a plurality of rows of perforations therein, the arrangement of the perforations in each of the rows being different, whereby said device can punch a plurality of codes in said tape according to the code selected position of said code plate.

4. A code tape punching device according to claim 2 in which indicia is provided on said base adjacent the mentioned side opening, and said extension having an opening therein in registry with part of said indicia, whereby said code plate can be moved to an indicated code selected position.

5. A code tape punching device according to claim 2 in which said elements are mounted on springs, said springs urging said elements outwardly in a direction toward said code plate.

References Cited in the file of this patent

UNITED STATES PATENTS

| | | |
|---|---|---|
| 252,550 | Ullman | Jan. 17, 1882 |
| 486,906 | Stenwall | Nov. 29, 1892 |
| 1,775,172 | Peirce | Sept. 9, 1930 |
| 1,962,193 | Heise | June 12, 1934 |
| 2,206,640 | Maul | July 2, 1940 |

FOREIGN PATENTS

| | | |
|---|---|---|
| 683,217 | France | Feb. 25, 1930 |